(12) United States Patent
Matsumoto et al.

(10) Patent No.: US 9,100,862 B2
(45) Date of Patent: Aug. 4, 2015

(54) TEST SIGNAL GENERATION APPARATUS AND METHOD BASED ON LTE-ADVANCED SYSTEM

(71) Applicant: ANRITSU CORPORATION, Kanagawa (JP)

(72) Inventors: Takashi Matsumoto, Kanagawa (JP); Yoshihiro Shiozawa, Kanagawa (JP)

(73) Assignee: ANRITSU CORPORATION, Kanagawa (JP)

( * ) Notice: Subject to any disclaimer, the term of this patent is extended or adjusted under 35 U.S.C. 154(b) by 123 days.

(21) Appl. No.: 14/083,500

(22) Filed: Nov. 19, 2013

(65) Prior Publication Data

US 2014/0242919 A1 Aug. 28, 2014

(30) Foreign Application Priority Data

Feb. 25, 2013 (JP) .................................. 2013-034862

(51) Int. Cl.
*H04W 24/00* (2009.01)
*H04W 24/06* (2009.01)
*H04B 17/00* (2015.01)

(52) U.S. Cl.
CPC ........... *H04W 24/06* (2013.01); *H04B 17/0085* (2013.01)

(58) Field of Classification Search
CPC .... H04L 1/0026; H04B 7/0632; H04B 17/00; H04B 17/0085; H04W 24/06

USPC ............ 455/423, 67.11, 67.12, 67.14, 115.1, 455/115.2; 375/224, 225; 714/712
See application file for complete search history.

(56) References Cited

U.S. PATENT DOCUMENTS

| 8,768,335 | B2* | 7/2014 | Yi et al. ...................... 455/422.1 |
| 8,831,586 | B2* | 9/2014 | Gao et al. ................... 455/422.1 |
| 8,982,936 | B2* | 3/2015 | Yang et al. ..................... 375/224 |
| 2013/0279357 | A1* | 10/2013 | Gao .............................. 370/252 |
| 2014/0128003 | A1* | 5/2014 | Takahashi .................... 455/67.7 |
| 2014/0323059 | A1* | 10/2014 | Wakasa et al. ............. 455/67.14 |

FOREIGN PATENT DOCUMENTS

JP 2007-116240 A 5/2007

* cited by examiner

*Primary Examiner* — Sonny Trinh
(74) *Attorney, Agent, or Firm* — Pearne & Gordon LLP

(57) ABSTRACT

To provide a technique for simplifying a parameter setting process required to generate a test signal based on an LTE-Advanced system. Carrier arrangement designation means 25 displays a screen for selecting one of an intra-band type or an inter-band type as the arrangement of a plurality of component carriers used in an LTE-Advanced system such that one of the intra-band type or the inter-band type is designated. Parameter file designation means 26 designates a parameter file to be allocated to the component carrier among test signal generating parameter files stored in a parameter file storage means 24. Parameter and frequency band allocation means 27 designates the component carrier to which the designated parameter file can be allocated and the allocated frequency band for communication in which the component carriers are arranged.

4 Claims, 9 Drawing Sheets

Table 1: Physical channel parameters of E-TM1.2

| Parameter | 1.4 MHz | 3 MHz | 5 MHz | 10 MHz | 15 MHz | 20 MHz |
|---|---|---|---|---|---|---|
| Reference, Synchronisation Signals | | | | | | |
| RS boosting, $P_B = E_B/E_A$ | 1 | 1 | 1 | 1 | 1 | 1 |
| Synchronisation signal EPRE / $E_{RS}$ [dB] | 0.000 | -4.730 | -4.730 | -4.730 | -4.730 | -4.730 |
| Reserved EPRE / $E_{RS}$ [dB] | -inf | -inf | -inf | -inf | -inf | -inf |
| PBCH | | | | | | |
| PBCH EPRE / $E_{RS}$ [dB] | 0.000 | -4.730 | -4.730 | -4.730 | -4.730 | -4.730 |
| Reserved EPRE / $E_{RS}$ [dB] | -inf | -inf | -inf | -inf | -inf | -inf |
| PCFICH | | | | | | |
| # of symbols used for control channels | 2 | 1 | 1 | 1 | 1 | 1 |
| PCFICH EPRE / $E_{RS}$ [dB] | 3.222 | 0 | 0 | 0 | 0 | 0 |
| PHICH | | | | | | |
| # of PHICH groups | 1 | 1 | 1 | 2 | 2 | 3 |
| # of PHICH per group | 2 | 2 | 2 | 2 | 2 | 2 |
| PHICH BPSK symbol power / $E_{RS}$ [dB] | -3.010 | -3.010 | -3.010 | -3.010 | -3.010 | -3.010 |
| PHICH group EPRE / $E_{RS}$ [dB] | 0 | 0 | 0 | 0 | 0 | 0 |
| PDCCH | | | | | | |
| # of available REGs | 23 | 23 | 43 | 90 | 140 | 187 |
| # of PDCCH | 2 | 2 | 2 | 5 | 7 | 10 |
| # of CCEs per PDCCH | 1 | 1 | 2 | 2 | 2 | 2 |
| # of REGs per CCE | 9 | 9 | 9 | 9 | 9 | 9 |
| # of REGs allocated to PDCCH | 18 | 18 | 36 | 90 | 126 | 180 |
| # of dummy REGs added for padding | 5 | 5 | 7 | 0 | 14 | 7 |
| PDCCH REG EPRE / $E_{RS}$ [dB] | 0.792 | 2.290 | 1.880 | 1.065 | 1.488 | 1.195 |
| <NIL> REG EPRE / $E_{RS}$ [dB] | -inf | -inf | -inf | -inf | -inf | -inf |
| PDSCH | | | | | | |
| # of QPSK PDSCH PRBs which are boosted | 2 | 6 | 10 | 20 | 30 | 40 |
| PRB $P_A = E_A/E_{RS}$ [dB] | 3 (*) | 3 | 3 | 3 | 3 | 3 |
| # of QPSK PDSCH PRBs which are de-boosted | 4 | 9 | 15 | 30 | 45 | 60 |
| PRB $P_A = E_A/E_{RS}$ [dB] | -2.990 (*) | -4.730 | -4.730 | -4.730 | -4.730 | -4.730 |

FIG. 2

Table 2: Numbers ($n_{PRB}$) of the boosted PRBs (FDD)

| | Subframe 0 | Subframe 1 | Subframe 2 | Subframe 3 | Subframe 4 | Subframe 5 | Subframe 6 | Subframe 7 | Subframe 8 | Subframe 9 |
|---|---|---|---|---|---|---|---|---|---|---|
| 1.4 MHz | N.A. | 1 3 | 1 3 | 2 3 | 2 5 | N.A. | 0 2 | 0 5 | 2 5 | 1 5 |
| 3 MHz | 0 1 2 11 12 13 | 0 4 10 11 12 13 | 0 3 5 6 11 13 | 0 1 4 5 7 12 | 0 2 3 4 9 10 | 1 2 3 11 12 14 | 4 6 8 11 13 14 | 2 5 6 12 13 14 | 0 3 4 7 8 11 | 1 3 4 5 11 12 |
| 5 MHz | 0 1 3 6 7 8 16 18 20 21 | 0 1 4 5 9 10 12 17 18 24 | 0 1 2 12 13 14 19 20 23 24 | 0 5 8 12 13 15 17 20 21 24 | 0 4 6 7 12 13 15 16 22 23 | 0 1 2 3 8 16 18 21 22 24 | 1 3 5 7 9 10 12 15 21 22 | 0 1 2 3 7 10 14 18 20 21 | 1 4 8 9 10 12 15 16 18 20 | 1 2 3 5 6 9 10 13 16 17 |
| 10 MHz | 1 2 7 8 9 10 11 16 20 31 32 33 35 36 39 40 42 46 47 48 | 5 6 7 9 11 15 20 21 22 24 25 27 34 35 36 37 40 44 46 49 | 3 5 11 12 14 17 18 19 20 22 26 27 28 29 31 34 38 41 42 49 | 1 2 3 5 8 14 16 22 23 26 28 30 32 34 38 41 42 45 46 47 | 0 3 6 7 8 9 10 12 13 16 18 21 23 31 33 41 42 45 46 47 | 0 2 3 4 5 7 9 10 11 12 15 19 20 28 29 30 31 34 36 48 | 0 1 4 6 8 9 10 16 17 19 20 21 24 29 30 31 35 37 38 47 | 2 3 4 5 6 9 10 12 16 17 19 22 24 25 26 30 34 37 42 48 | 7 9 14 15 16 21 22 28 30 31 32 34 35 41 42 43 44 46 48 49 | 11 13 16 17 18 21 24 27 28 29 30 32 37 38 40 42 45 47 48 49 |
| 15 MHz | 0 1 2 3 5 7 8 9 12 18 19 20 21 23 24 25 29 30 31 32 33 42 47 48 49 63 65 68 71 73 | 0 1 3 4 5 6 7 11 18 20 21 24 26 30 31 38 46 47 49 50 51 53 54 57 60 67 68 70 73 74 | 2 11 12 15 18 21 22 24 25 26 29 32 33 34 42 45 46 47 50 51 52 54 58 59 60 64 68 70 72 74 | 2 3 4 7 9 11 12 15 17 20 24 27 33 34 35 39 42 43 45 46 48 56 59 60 62 67 70 71 73 74 | 4 5 6 8 13 17 22 25 27 29 31 32 33 34 35 41 44 46 48 50 52 56 59 60 64 67 69 70 71 74 | 0 2 3 4 7 8 18 20 23 24 25 27 29 42 43 45 47 49 50 54 56 60 62 65 66 67 70 71 72 73 | 2 11 14 15 18 25 26 28 30 31 32 33 36 37 38 39 41 43 45 50 53 54 58 59 61 62 65 62 65 67 68 70 71 | 3 4 7 12 19 23 24 26 27 28 30 33 34 35 41 42 49 53 54 58 59 60 61 62 65 67 69 70 71 73 | 0 3 8 9 10 13 14 15 17 18 19 22 23 24 25 26 27 32 37 39 47 50 53 56 61 63 69 71 73 74 | 0 3 7 8 11 13 14 16 18 23 25 30 32 35 44 46 47 48 53 55 57 59 61 62 64 67 68 69 70 71 |
| 20 MHz | 0 6 10 13 15 16 20 23 25 28 29 30 31 32 33 39 41 42 44 45 54 56 57 63 66 67 68 76 77 79 82 84 85 88 92 94 95 97 98 99 | 1 3 7 9 10 13 19 20 21 22 23 25 26 27 30 33 34 35 36 47 49 50 51 53 55 57 60 61 64 68 76 77 80 83 84 86 87 89 95 99 | 1 2 3 6 8 10 11 15 16 17 19 21 25 26 28 29 32 35 39 41 42 43 44 51 52 54 60 64 69 72 76 77 84 86 88 89 90 93 94 99 | 5 7 9 10 12 15 16 21 23 24 27 28 29 30 33 34 35 36 39 47 49 54 55 56 57 60 64 70 64 66 70 72 76 77 81 83 85 80 81 86 87 90 91 92 98 99 | 2 3 4 5 6 7 14 17 19 21 22 24 26 37 42 44 47 49 51 56 57 62 63 65 67 70 71 73 76 77 81 83 85 86 87 89 94 95 97 99 | 1 2 5 6 8 9 12 13 21 22 25 26 28 32 35 39 40 43 45 46 57 59 61 62 64 66 68 71 73 77 78 84 85 86 93 94 95 96 97 99 | 0 1 2 3 5 8 9 10 12 22 25 26 27 29 31 32 33 36 38 39 43 45 49 53 55 59 62 63 64 71 72 73 75 04 66 67 77 78 81 84 89 97 98 | 0 1 3 4 5 7 11 18 19 20 21 26 27 29 30 31 33 35 39 40 41 43 44 46 47 50 53 55 56 62 64 66 07 69 70 72 74 92 93 98 | 2 3 4 7 11 13 15 16 24 25 20 21 26 27 29 35 36 40 43 44 45 46 51 52 55 56 57 63 64 65 68 71 77 78 81 82 83 84 85 86 90 94 98 | 0 4 7 8 10 11 16 18 22 26 29 32 35 37 43 44 46 47 48 49 53 54 57 59 60 61 64 66 67 69 70 76 78 81 84 87 89 91 95 96 |

FIG. 3

Table 3: Numbers ($n_{PRB}$) of the boosted PRBs (TDD)

| Frame1 | Subframe 0 | Subframe 1 | Subframe 5 | Subframe 6 | Subframe 7 | Subframe 8 | Subframe 9 |
|---|---|---|---|---|---|---|---|
| 1.4 MHz | N.A. | N.A. | N.A. | N.A | 4 5 | 2 5 | 0 3 |
| 3 MHz | 0 1 3 11 12 14 | 1 2 3 11 12 14 | 0 1 2 3 11 13 | 1 3 11 12 13 14 | 1 4 8 10 11 12 | 1 6 8 9 11 12 | 0 2 3 4 5 6 |
| 5 MHz | 1 2 5 8 17 18 19 21 23 24 | 1 3 5 6 7 17 19 20 23 24 | 0 3 4 5 8 17 18 19 21 22 | 2 3 6 7 8 17 18 19 20 24 | 1 2 11 13 15 17 18 19 20 21 | 1 2 4 5 6 7 8 9 10 12 | 1 3 4 8 10 12 16 19 20 22 |
| 10 MHz | 2 4 6 7 10 11 13 17 18 19 34 35 37 38 41 42 46 47 48 49 | 1 3 6 7 9 11 14 15 17 18 19 28 29 30 35 37 38 39 43 44 | 3 4 5 6 10 11 12 14 16 18 30 34 35 36 37 39 40 41 43 48 | 2 4 6 7 8 9 10 13 14 16 19 20 21 29 32 34 39 41 44 45 | 2 4 7 12 14 16 20 21 24 26 28 29 34 41 43 44 45 46 47 48 | 2 5 8 9 11 12 13 16 18 21 22 23 27 29 30 31 32 33 46 47 | 1 4 7 11 12 13 14 15 20 21 27 31 34 37 38 41 42 46 48 49 |
| 15 MHz | 3 5 6 9 10 13 15 17 20 23 25 26 27 28 29 33 44 45 51 53 56 57 58 61 63 66 70 71 73 74 | 1 5 7 8 9 10 11 13 15 19 21 24 26 42 45 46 51 52 53 55 56 57 58 59 60 61 62 64 65 72 | 3 4 6 7 9 10 11 13 14 15 16 20 22 24 25 28 31 32 33 43 49 52 55 58 61 62 66 67 70 73 | 3 4 7 8 12 13 14 16 18 19 20 22 24 27 28 30 32 41 42 43 44 46 49 50 51 65 67 68 69 71 | 2 6 8 9 10 11 13 16 18 19 21 22 26 30 31 41 45 46 47 48 51 55 57 58 62 63 64 69 73 74 | 0 2 7 11 13 17 19 20 23 27 28 31 39 40 41 43 45 46 47 48 51 55 57 58 63 65 66 70 71 73 | 1 2 3 7 8 9 10 12 13 17 19 21 22 23 24 28 30 32 37 40 41 46 48 53 56 58 61 65 69 73 |
| 20 MHz | 2 4 7 8 12 13 14 18 20 21 23 27 28 31 34 35 37 38 39 44 46 53 56 58 60 68 70 71 74 75 76 78 82 85 87 88 93 95 97 99 | 4 5 6 7 8 9 10 11 12 14 17 19 20 22 25 27 28 29 32 33 37 38 41 43 53 58 61 65 69 70 73 74 78 79 80 82 83 86 90 97 | 4 5 9 11 13 14 16 19 22 24 25 27 29 32 33 37 40 42 43 45 46 53 54 57 58 62 66 67 68 69 83 86 88 89 90 91 92 93 95 97 | 2 3 8 9 10 11 12 14 15 17 18 22 24 26 28 30 35 36 40 41 42 53 55 60 61 62 63 64 65 68 74 77 82 84 85 87 93 97 98 99 | 0 3 10 13 14 17 23 25 27 28 30 31 36 37 38 40 41 43 49 50 54 55 57 58 60 61 63 64 70 74 76 77 81 84 85 87 88 94 95 98 | 2 3 4 10 11 12 15 18 21 22 23 26 30 31 32 36 37 39 40 41 42 43 48 50 53 54 56 58 61 64 66 71 72 77 81 82 89 92 98 99 | 4 9 12 13 17 19 20 21 22 29 31 36 37 39 40 41 42 46 48 49 54 56 57 60 64 66 73 74 75 80 83 86 87 89 90 92 94 96 98 99 |

FIG. 4

| Frame2 | Subframe 0 | Subframe 1 | Subframe 5 | Subframe 6 | Subframe 7 | Subframe 8 | Subframe 9 |
|---|---|---|---|---|---|---|---|
| 1.4 MHz | N.A. | N.A. | N.A. | N.A. | 4 5 | 1 2 | 1 3 |
| 3 MHz | 0 1 2 11 12 13 | 0 1 2 3 13 14 | 0 1 2 3 12 14 | 0 1 2 3 11 13 | 0 3 4 6 10 12 | 2 6 9 11 13 14 | 1 5 7 9 13 14 |
| 5 MHz | 1 2 3 8 17 20 21 22 23 24 | 1 2 4 5 6 7 16 17 22 23 | 1 2 4 6 8 16 18 21 23 24 | 0 3 5 6 7 17 19 20 21 24 | 2 3 8 10 13 15 16 21 23 24 | 0 4 6 7 13 14 15 16 19 24 | 0 2 5 9 14 18 19 21 22 23 |
| 10 MHz | 1 4 5 6 8 11 12 13 15 17 20 28 30 31 32 42 43 46 48 49 | 0 1 7 15 18 19 20 21 29 30 32 34 35 37 38 40 42 43 44 47 | 1 2 5 6 8 9 11 13 14 15 16 18 20 30 32 33 40 41 46 49 | 0 7 10 11 15 18 19 20 21 28 29 33 35 36 38 40 41 43 44 49 | 2 4 10 11 18 20 23 24 28 30 32 37 40 41 43 44 45 46 47 48 | 6 8 9 10 11 14 15 16 18 19 20 21 23 24 27 28 36 37 47 49 | 2 5 7 8 9 14 16 18 23 30 32 33 34 37 41 42 44 45 46 49 |
| 15 MHz | 3 7 10 11 15 16 17 23 27 29 30 31 32 42 43 48 49 50 53 54 57 60 62 64 65 66 67 69 72 74 | 8 9 11 12 14 15 17 22 23 24 27 28 29 31 41 42 45 48 51 54 55 56 62 63 67 68 70 71 73 74 | 1 3 9 11 13 17 21 22 23 24 25 28 29 46 48 49 51 52 53 54 55 57 61 64 65 67 68 72 73 74 | 0 2 4 6 10 11 13 14 15 16 17 20 22 23 28 29 43 44 46 47 51 53 54 56 59 61 63 69 71 72 | 0 1 3 5 9 11 14 15 16 19 24 25 26 27 28 31 33 34 38 40 42 43 46 48 50 52 59 61 67 74 | 0 4 5 8 9 10 12 13 15 20 22 30 32 33 35 37 38 42 44 45 46 47 48 51 52 55 59 60 66 69 | 1 5 8 9 10 13 14 15 20 21 23 26 27 28 29 32 33 34 39 43 44 57 60 62 64 65 69 71 72 73 |
| 20 MHz | 1 4 10 14 15 17 18 19 23 29 30 31 32 33 37 38 39 42 46 55 61 64 65 66 68 69 70 72 73 76 82 83 84 86 89 90 93 95 97 99 | 0 1 3 5 8 12 14 15 17 19 20 22 23 25 26 28 29 30 37 38 39 45 58 59 62 63 68 71 72 75 78 82 84 85 91 92 93 94 96 98 | 0 2 4 5 6 7 11 12 13 14 16 19 20 21 27 30 32 33 35 37 41 44 46 53 56 58 60 61 62 64 65 67 68 70 73 79 82 90 92 98 | 0 2 4 6 7 11 12 13 17 18 19 20 27 28 31 35 37 38 40 43 45 56 57 59 63 68 70 71 77 79 80 82 85 87 89 92 95 96 97 98 | 3 5 6 7 9 16 20 21 23 24 25 26 31 32 35 37 41 42 43 44 46 48 51 54 59 60 61 62 64 67 76 77 78 79 82 84 86 87 88 95 | 1 4 7 10 13 18 19 25 26 27 28 30 32 35 37 38 41 46 47 50 51 52 53 54 57 60 62 70 71 73 78 79 81 83 84 87 91 95 98 99 | 0 1 2 3 5 7 8 10 11 15 19 20 21 24 26 28 31 32 33 34 44 45 54 58 59 61 63 65 67 69 70 77 85 88 89 90 92 94 98 99 |

FIG. 5

| E-UTRA Operating Band | Uplink operating band BS receive UE transmit (MHz) | Downlink operating band BS transmit UE receive (MHz) | Duplex Mode |
|---|---|---|---|
| 1 | 1920~1980 | 2110~2170 | FDD |
| 2 | 1850~1910 | 1930~1990 | FDD |
| 3 | 1710~1785 | 1805~1880 | FDD |
| 4 | 1710~1755 | 2110~2155 | FDD |
| 5 | 824~849 | 869~894 | FDD |
| 6 | 830~840 | 875~885 | FDD |
| 7 | 2500~2570 | 2620~2690 | FDD |
| ---- | ---- | ---- | |
| 36 | 1930~1990 | 1930~1990 | TDD |
| 37 | 1910~1930 | 1910~1930 | TDD |
| 38 | 2570~2620 | 2570~2620 | TDD |
| 39 | 1880~1920 | 1880~1920 | TDD |
| 40 | 2300~2400 | 2300~2400 | TDD |
| 41 | 2496~2690 | 2496~2690 | TDD |
| 42 | 3400~3600 | 3400~3600 | TDD |
| 43 | 3600~3800 | 3600~3800 | TDD |

TEST SIGNAL GENERATION APPARATUS AND METHOD BASED ON LTE-ADVANCED SYSTEM

TECHNICAL FIELD

The present invention relates to a technique for generating test signals for testing the operation of devices under test including user equipments, such as mobile phones and smart phones, base stations, and RF devices used in the user equipments and the base stations, and more particularly, to a technique capable of easily generating test signals corresponding to a radio communication standard which is called an LTE-Advanced system with a higher processing speed than an LTE system.

BACKGROUND ART

With an increase in the functions of the user equipments, the speed of radio communication with the base station has increased. In recent years, in a 3GPP LTE standard, LTE Release (hereinafter, referred to as Rel) 10 (a downstream speed of 1 Gbps and an upstream speed of 500 Mbps), which is called an LTE-Advanced system, with a higher processing speed than that of LTE Rel 8 (a downstream speed of 300 Mbps and an upstream speed of 75 Mbps) has been put to practical use.

In the LTE-Advanced standard, a "carrier aggregation" (hereinafter, referred to as CA) technique which treats the carrier used in LTE Rel 8 as a component carrier (hereinafter, referred to as CC) unit and uses up to five component carriers at the same time to communicate with one user equipment has been used to expand a communication bandwidth and to increase the processing speed.

In contrast, in the LTE test system according to the related art, a baseband test signal (orthogonal components I and Q) corresponding to one carrier which is used for communication with the device under test is generated, a signal which is quadrature-modulated with the test signal is frequency-converted into a signal in a communication frequency band, and the converted signal is used.

A great number of parameters are needed in order to generate the test signal and the tester sets the parameters one by one. Therefore, this structure is inefficient.

Therefore, for example, in 3GPP TS36.141 (BS test standard) which is a base station test standard, combinations of plural types of test models for specifying test conditions and a channel band of carriers required to generate test signals for each test model are defined in advance, parameter information (parameter file) is stored in a storage unit in advance, and the tester selects the test model and the channel band to generate waveform data of the test signal for performing the selected test model in the designated channel bandwidth.

As an example of the test system, Patent Document 1 discloses a system which generates a test signal for testing a user equipment, converts the signal which is quadrature-modulated with the test signal into a signal in the communication frequency band, and outputs the converted signal.

PRIOR ART DOCUMENT

Patent Document

[Patent Document 1] Japanese Unexamined Patent Application, First Publication No. 2007-116240

DISCLOSURE OF THE INVENTION

Problem that the Invention is to Solve

However, the CA technique used in the LTE-Advanced system includes an intra-band type in which the carrier used for communication is one component, a plurality of CCs are used, and the CCs are contiguously or non-contiguously arranged in one allocated frequency band for communication and an inter-band type in which a plurality of CCs are divided and arranged in different allocated frequency bands for communication. In order to respond to the intra-band type and the inter-band type, it is necessary to designate each allocated frequency band for communication, the test model for each CC, or the bandwidth. The designation operation is very complicated and troublesome.

The invention has been made in view of the above-mentioned problems and an object of the invention is to provide a test signal generation apparatus and method based on an LTE-Advanced system which is capable of simplifying a parameter setting process required to generate a test signal based on the LTE-Advanced system.

Means for Solving the Problem

In order to achieve the object, according to a first aspect of the invention, a test signal generation apparatus based on an LTE-Advanced system includes: a display unit (21); an operation unit (22); parameter file storage means (24) for storing in advance test signal generating parameter files which can be allocated to a plurality of component carriers used to test an operation of a device under test, which is a base station or a user equipment corresponding to the LTE-Advanced system, or an RF device used in the base station or the user equipment; carrier arrangement designation means (25) for displaying, on the display unit, a screen for selecting one of an intra-band type in which the plurality of component carriers are contiguously or non-contiguously arranged in one allocated frequency band for communication and an inter-band type in which the plurality of component carriers are divided and arranged in different allocated frequency bands for communication such that the operation unit is operated to designate one of the intra-band type and the inter-band type; parameter file designation means (26) for displaying a screen for selecting the parameter files stored in the parameter file storage means on the display unit such that the operation unit is operated to designate any one of the parameter files; parameter and frequency band allocation means (27) for displaying, on the display unit, a screen of a list of the plurality of component carriers and for designating at least one component carrier in the list and a screen for selecting the type of the allocated frequency band for communication in which the component carrier in the list is arranged, when the parameter file designation means designates the parameter file, such that the operation unit is operated to designate the component carrier to which the designated parameter file is allocated and the allocated frequency band for communication in which the component carrier is arranged; and a test signal generation unit (29) that generates test signals for each component carrier in the designated allocated frequency band for communication on the basis of information designated by the carrier arrangement designation means and the parameter and frequency band allocation means.

According to a second aspect of the invention, in the test signal generation apparatus based on the LTE-Advanced system according to the first aspect, the test signal generation unit may include plural types of signal processing units for generating signals such that signals used in different allocated frequency bands for communication are independently generated. When the intra-band type is designated, one type of signal processing unit may give a frequency offset to the signals, combine the signals, and output the combined signal. When the inter-band type is designated, two types of signal processing units may be used to generate baseband signals for each allocated frequency band for communication.

According to a third aspect of the invention, a test signal generation method based on an LTE-Advanced system includes: a step of storing in advance test signal generating parameter files which can be allocated to a plurality of component carriers used to test an operation of a device under test, which is a base station or a user equipment corresponding to the LTE-Advanced system or an RF device used in the base station or the user equipment; a step of displaying a screen for selecting, as the arrangement of the plurality of component carriers, one of an intra-band type in which the plurality of component carriers are contiguously or non-contiguously arranged in one allocated frequency band for communication and an inter-band type in which the plurality of component carriers are divided and arranged in different allocated frequency bands for communication such that one of the intra-band type and the inter-band type is designated; a step of displaying a screen for selecting the test signal generating parameter files which can be allocated to the plurality of component carriers such that any one of the parameter files is designated; a step of displaying a screen of a list of the plurality of component carriers and for designating at least one component carrier in the list and a screen for selecting the type of the allocated frequency band for communication in which the component carrier in the list is arranged such that the component carrier to which the designated parameter file is allocated and the allocated frequency band for communication in which the component carrier is arranged are designated; and a step of generating test signals for each component carrier in the designated allocated frequency band for communication on the basis of information about the type which is designated as the carrier arrangement, the parameter file allocated to the component carrier, and the allocated frequency band for communication in which the component carrier is arranged.

According to a fourth aspect of the invention, in the test signal generation method based on the LTE-Advanced system according to the third aspect, the step of generating the test signals for each component carrier may include plural types of signal processing steps for generating signals such that signals used in different allocated frequency bands for communication are independently generated. When the intra-band type is designated, one type of signal processing step may give a frequency offset to the signals, combine the signals, and output the combined signal. When the inter-band type is designated, two types of signal processing steps may be used to generate baseband signals for each allocated frequency band for communication.

Advantage of the Invention

According to the above-mentioned aspects of the invention, when a desired parameter file is designated, a screen for designating a list of a plurality of component carriers to which the parameter file can be allocated and any one of the component carriers is displayed. Therefore, it is possible to collectively allocate the designated parameter file to the plurality of component carriers and to very easily generate a test signal used to test a device under test corresponding to the LTE-Advanced system.

BRIEF DESCRIPTION OF THE DRAWINGS

FIG. 2 shows a list of parameters used in a standardized test model.

FIG. 3 shows a list of frame generating parameters in an FDD mode.

FIG. 4 shows a list of parameters for generating a first frame in a TDD mode.

FIG. 5 shows a list of parameters for generating a second frame in the TDD mode.

FIG. 7 is a diagram illustrating the correspondence of a transmission and reception frequency range and a transmission and reception switching method to a test frequency band number.

BEST MODE FOR CARRYING OUT THE INVENTION

Hereinafter, embodiments of the invention will be described with reference to the drawings.

Figure 1:
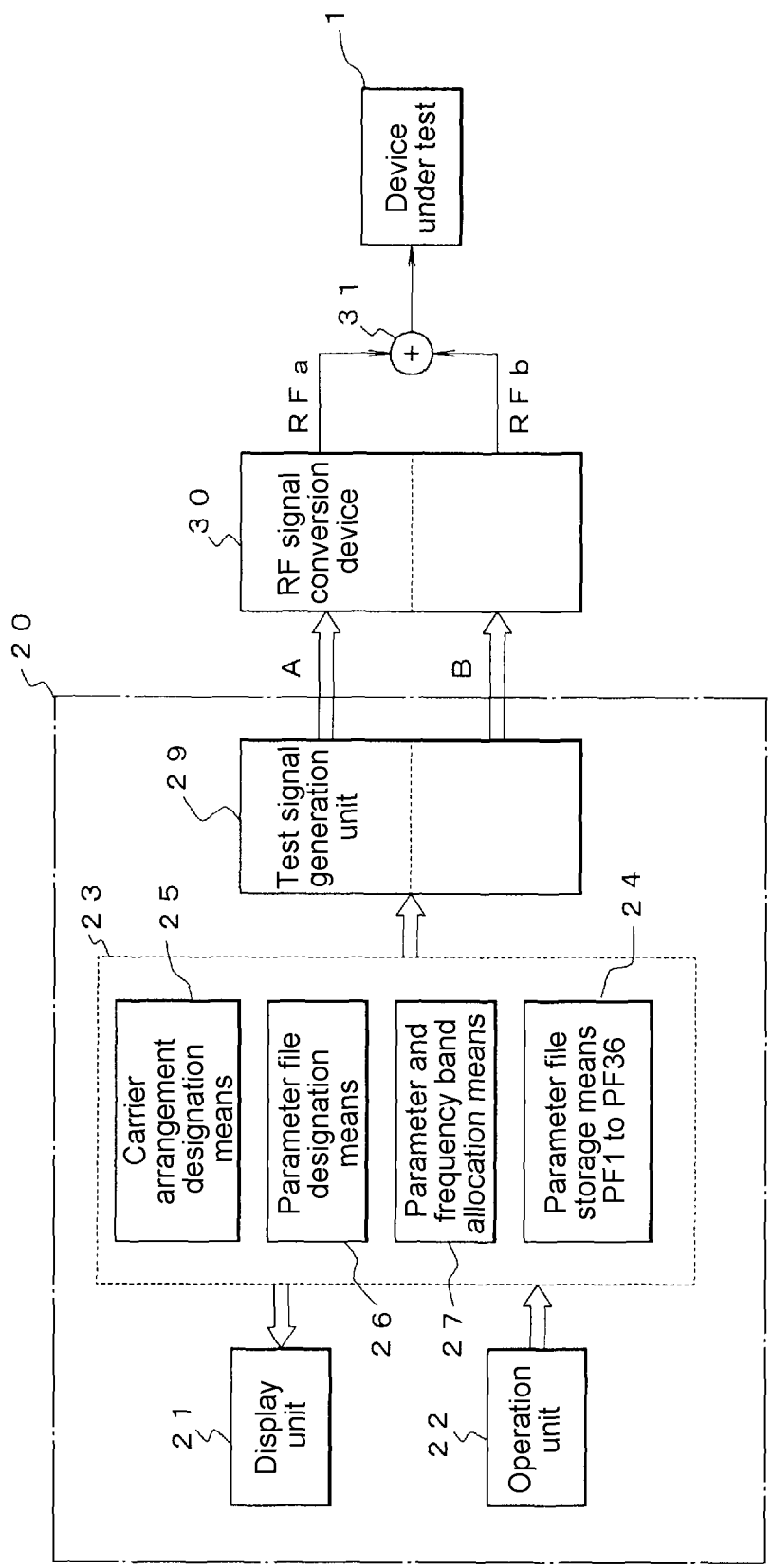
FIG. 1 is a diagram illustrating a test system including an embodiment of the invention.

FIG. 1 shows the structure of a test signal generation apparatus 20 based on an LTE-Advanced system according to the invention and a test system using the test signal generation apparatus 20.

The test signal generation apparatus 20 includes a display unit 21, an operation unit 22, a parameter setting unit 23, and a test signal generation unit 29 and transmits a generated baseband test signal to an RF signal conversion device 30. The RF signal conversion device 30 converts the baseband test signal into a signal in a frequency band which is actually used for communication and transmits the converted signal to a device 1 under test. In this embodiment, a case in which the device 1 under test is a base station will be described.

The parameter setting unit 23 of the test signal generation apparatus 20 sets parameter information for generating the test signals which are used to test the operation of the device 1 under test that performs communication based on the LTE-Advanced system and includes parameter file storage means 24, carrier arrangement designation means 25, parameter file designation means 26, and parameter and frequency band allocation means 27.

The parameter file storage means 24 stores test signal generating parameter files which can be allocated to a plurality of component carriers used for communication based on the LTE-Advanced system in advance.

As described above, the parameter file is specified by combinations of plural types of test models for specifying test conditions and the channel band of a CC required to generate the test signals for each test model. For example, six types of test models, that is, E-TM1.1, E-TM1.2, E-TM2, E-TM3.1, E-TM3.2, and E-TM3.3 are defined.

The test models specify signal generating parameters which are described in a measurement standard "3GPP TS36.14 Transmitter Characteristics" for a base station (BS) test.

As an example, E-TM1.2 (E-UTRA Test Model 1.2) will be described below.

An E-TM1.2 signal is used to measure unnecessary emission (adjacent channel leakage power and operating band unwanted emissions; conditions: modulation system QPSK and addition of a power fluctuation) in the transmission test of the base station. The details of the parameters for generating the signal are values described in Tables 1 to 3 shown in FIGS. 2 to 5.

First, Table 1 shown in FIG. 2 will be described. Set values (including power) of downlink physical channels for six bands from 1.4 MHz to 20 MHz are described.

Among them, reference signals are used for, for example, synchronous detection, radio link control, and a cell search and synchronization signals are used for a cell search in which a user terminal detects the base station.

In addition, a broadcast channel (PBCH) is used to broadcast control information to all cells and a control channel configuration indication channel (PCFICH) indicates the number of OFDM symbols used for the control channel (PDCCH). A hybrid ARQ indication channel (PHICH) is used to transmit ACK/NACK information to an upstream data channel (PUSCH).

A downstream link control channel (PDCCH) indicates information about a downstream data channel (PDSCH) and the upstream data channel (PUSCH) and the downstream data channel (PDSCH) is used to transmit user data or upper layer control information.

Table 2 shown in FIG. 3 includes a physical resource block (unit in a frequency direction: one resource block includes 12 sub-carriers) number of the downstream data channel (PDSCH) which performs a power boost in an FDD mode in which transmission and reception are performed in different frequency bands. Table 3 shown in FIGS. 4 and 5 includes the physical resource block number of the downstream data channel (PDSCH) which performs a power boost corresponding to two frames (Frame1 and Frame2) in a TDD mode in which transmission and reception are time-divisionally performed at the same frequency.

The use and conditions of the other test models are as follows.

(E-TM1.1)

Use: base station output power, unnecessary radiation (an occupied frequency bandwidth, adjacent channel leakage power, operating band unwanted emissions, and transmitter spurious emissions), transmitter intermodulation, and absolute reference signal accuracy Conditions: modulation system QPSK and no power fluctuation (E-TM2)

Use: total power dynamic range (lower OFDM symbol power limit at minimum power), error vector amplitude EVM of single 64 QAM PRB allocation (at minimum power), and frequency error (at minimum power)

Conditions: modulation system 64 QAM: 1% OFF: 99%, power fluctuation 64 QAM: 0 dB, and OFF: $-\infty$ (E-TM3.1)

Use: total power dynamic range (upper OFDM symbol power limit at maximum power with all 64 QAM PRBs allocated) and transmission signal quality (frequency error and EVM for 64 QAM modulation)

Conditions: modulation system 64 QAM and no power fluctuation (E-TM3.2)

Use: transmission signal quality (frequency error, EVM for 16 QAM modulation)

Conditions: modulation system 16 QAM: 60% QPSK: 40%, power fluctuation 16 QAM: $-3$ dB, and QPSK: $+2.426$ dB (E-TM3.3)

Use: transmission signal quality (frequency error and EVM for QPSK modulation)

Conditions: modulation system 16 QAM: 50%, QPSK: 50%, power fluctuation QPSK: $-6$ dB, and 16 QAM: $+2.427$ dB In these test models, signal generating parameters for six types of bands are also defined. The parameter file storage means 24 stores the signal generating parameters and combinations of six types of test models and six types of bands 1.4 MHz, 3 MHz, 5 MHz, 10 MHz, 15 MHz, and 20 MHz, that is, 36 sets of parameter files PF1 to PF36 in a specific file format.

Figure 6:
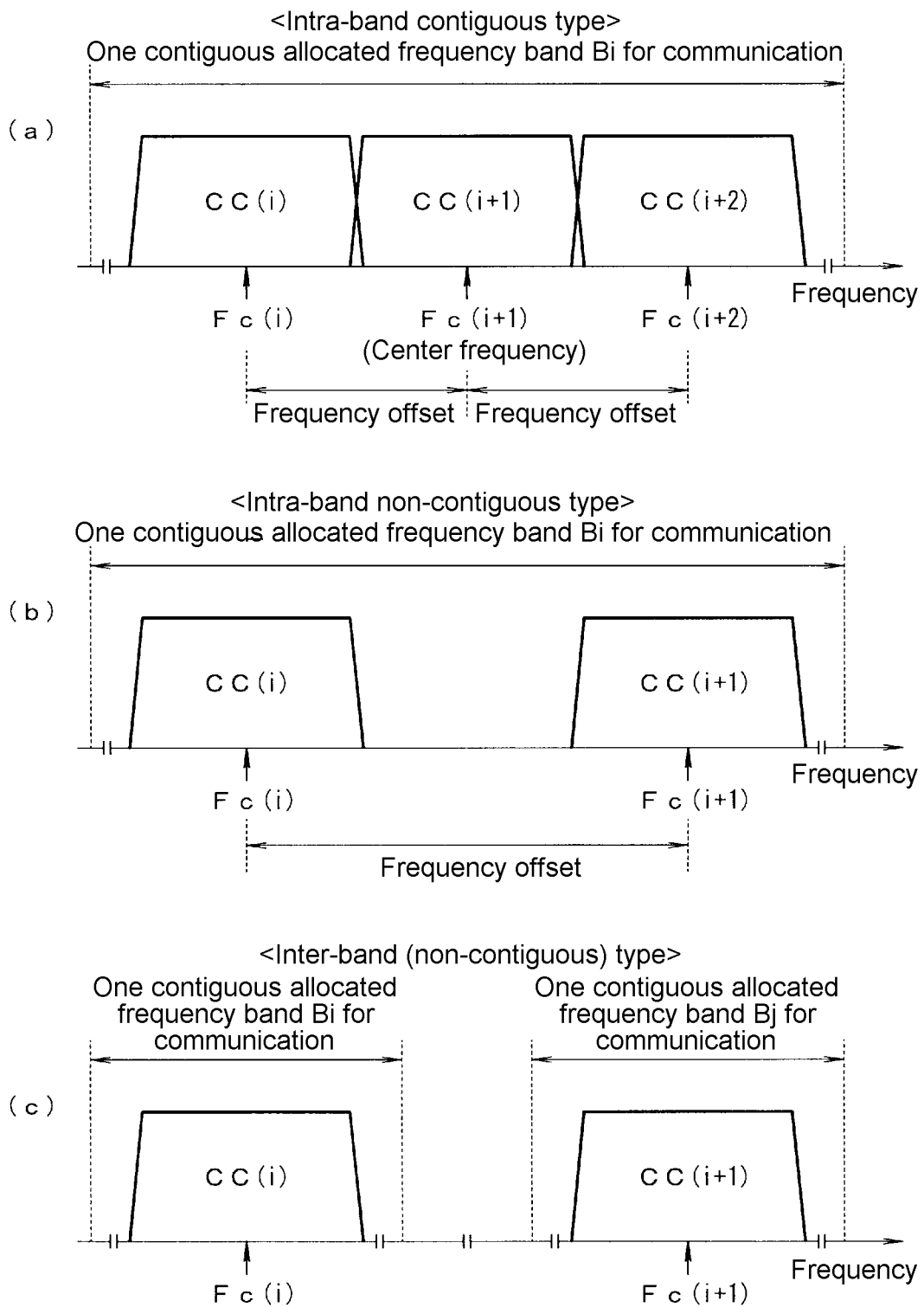
FIG. 6 is a diagram illustrating an example of the arrangement of a plurality of component carriers.

The carrier arrangement designation means 25 designates the arrangement of a plurality of CCs used for a test. As shown in (a) of FIG. 6, there is an intra-band contiguous type in which a plurality (in this example, three) of CCs are contiguously arranged in one allocated frequency band Bi for communication. As shown in (b) of FIG. 6, there is an intra-band non-contiguous type in which a plurality (in this example, two) of CCs are non-contiguously arranged in one allocated frequency band Bi for communication. As shown in (c) of FIG. 6, there is an inter-band (non-contiguous) type in which a plurality (in this example, two) of CCs are divided and allocated to different allocated frequency bands Bi and Bj for communication. These types are displayed such that any one of them can be designated and the operation unit 22 is used to designate the type.

When the arrangement of carriers is designated, it is necessary to determine the actual frequency information of the CC used. In the Rel 10 standard, the frequency band used for a test is defined.

FIG. 7 shows some of the frequency bands. Serial numbers 1 to 43 are given to the operating bands. The transmission and reception frequency range in the FDD mode and the transmission and reception frequency range (in this system, the transmission and reception frequencies are equal to each other) in the TDD mode are determined for each number. For example, when the tester designates band number 1 in the intra-band contiguous type, CCs in the FDD mode with a channel width which is designated in a frequency range of 2110 MHz to 2170 MHz (base station transmission mode: BS transmit) corresponding to band number 1 are contiguously arranged.

For example, when the tester designates band number 40 in the intra-band contiguous type, CCs in the TDD mode with a channel width which is designated in a frequency range of 2300 MHz to 2400 MHz (base station transmission mode: BS transmit) corresponding to band number 40 are contiguously arranged.

For example, when the tester designates band numbers 1 and 5 in the inter-band type, CCs in the FDD mode are arranged in the frequency range of 2110 MHz to 2170 MHz (base station transmission mode: BS transmit) corresponding to band number 1 and a frequency range of 869 MHz to 894 MHz (base station transmission mode: BS transmit) corresponding to band number 5.

The center frequency of the CCs which are actually arranged is unambiguously determined when the channel arrangement type and the band number are designated.

The parameter file designation means 26 displays a screen for selecting the parameter files stored in the parameter file storage means 24 after the channel arrangement designation process ends such that a predetermined operation is performed through the operation unit 22 to designate any one of the parameter files.

Figure 8:
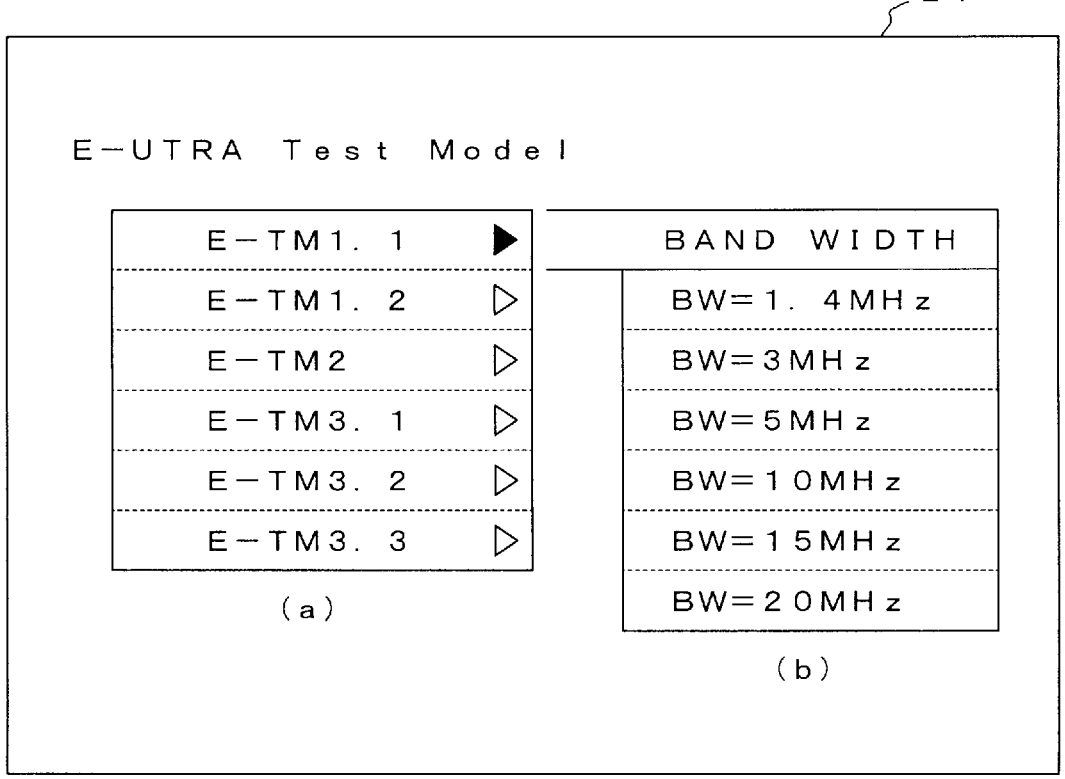
FIG. 8 is a diagram illustrating an example of a display when a parameter file is designated.

In practice, as described above, the parameter files are defined by combinations of six types of test models and six types of channel bands. Therefore, in this embodiment, for example, first, as in a list (a) of FIG. 8, a list of six types of test models is displayed on a screen of the display unit 21 and any one of them is designated by the operation of the operation unit 22 (a cursor key operation or an operation of a pointing device, such as a mouse). Then, a list (b) of six types of channel bands combined with the designated test model is displayed and any one of them is designated by the operation of the operation unit 22.

After the parameter file designation means 26 specifies the parameter file, the parameter and frequency band allocation means 27 displays, on the display unit 21, a screen for selecting a list of a plurality of CCs and any one of the plurality of CCs and a screen for selecting the type of allocated frequency band for communication in which the selected CC is arranged. The operation unit 23 is operated to designate the CC for allocating the designated parameter file and to designate the allocated frequency band for communication in which the designated CC is arranged.

Figure 9:
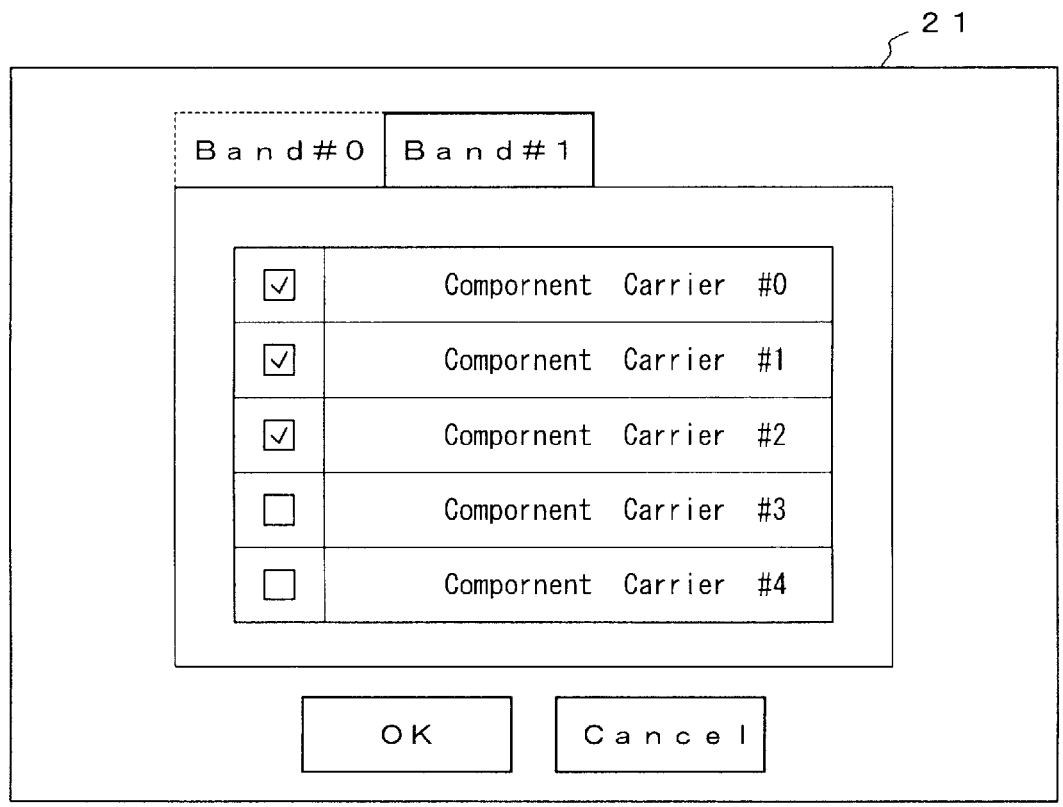
FIG. 9 shows a list of component carriers to which the designated parameter file is allocated.

In the display operation, for example, as shown in FIG. 9, a list of the names of five CCs (CC#0 to CC#4) which can be designated and check boxes for selecting the CCs are displayed and band buttons BAND#0 and BAND#1 indicating the type of allocated frequency band for communication in which the selected CC is arranged are displayed. The operation unit 22 is operated to click the band button corresponding to the arranged allocated frequency band for communication, thereby putting a check mark on the CC which is arranged in the allocated frequency band for communication. When an OK button shown in FIG. 9 is clicked, the parameter required to generate the test signal and the frequency to be allocated are determined. When a cancel button is clicked, the check mark is removed and the designation operation is performed again. FIG. 9 shows an example in which the designated parameter file is allocated to three CCs #0 to #3 which are arranged in the allocated frequency band for communication corresponding to the band button BAND#1.

As such, immediately after the desired parameter file is designated, the parameter and frequency band allocation means 27 displays a list of CCs for allocating the desired parameter file such that the CCs can be collectively selected. Therefore, it is very easy for the operator to set the parameter required to generate signals for the LTE-Advanced system using a plurality of CCs.

When the parameter required to generate test signals is determined in this way and the information thereof is input to the test signal generation unit 29, the test generation unit 29 generates test signals for each CC on the basis of the input parameter information.

When the intra-band type in which a plurality of CCs used for a test are arranged in a common allocated frequency band for communication is designated, the test signal generation unit 29 gives a frequency offset to the signals for the CCs and combines the signals. Therefore, it is possible to respond to the intra-band type using a transmission system corresponding to one allocated frequency band for communication in the subsequent process.

In contrast, when the inter-band type in which a plurality of CCs used for a test are arranged in different allocated frequency bands for communication is designated, it is difficult to give the same frequency offset to the signals for the CCs and combine the signals because there is a large frequency difference between different allocated frequency bands for communication (for example, there is a difference of 400 MHz between 800 MHz and 1200 MHz). For example, even when the signals can be combined with each other, it is difficult to respond to the inter-band type using the transmission system corresponding to one allocated frequency band for communication.

Therefore, in order to respond to the inter-band type, the test signal generation unit 29 includes plural types (in FIG. 1, two types) of signal processing units for generating signals so as to independently generate signals used for different allocated frequency bands for communication. When the intra-band type is designated, one type of signal processing unit gives a frequency offset to signals, combines the signals, and outputs the combined signal (for example, a signal A). When the inter-band type is designated, two types of signal processing units are used to generate baseband signals A and B for each allocated frequency band for communication.

The test signals generated by the test signal generation unit 29 are baseband I and Q signal data (waveform data) corresponding to a predetermined number of frames. When the signal data is transmitted to the RF signal conversion device 30, it is converted into a test signal in the frequency band which is actually used for communication and the test signal is input to the device 1 under test. Then, the device 1 under test is tested. For example, when the device 1 under test is a base station, it is checked whether the measurement result satisfies the standard using, for example, the error measurement function of the base station which has received the test signals corresponding to each test model.

The RF signal conversion device 30 performs quadrature modulation and a frequency conversion process using the I and Q signal data. As described above, the RF signal conversion device 30 includes plural types (in FIG. 1, two types) of signal processing units which perform the quadrature modulation process and the frequency conversion process so as to respond to plural types of I and Q signal data output from the test signal generation unit 29.

In the intra-band type, one type of signal processing unit is used to generate a test signal (for example, RFa) corresponding to a plurality of CCs in the designated allocated frequency band (for example, a band of 2000 MHz) for communication and to output the generated test signal. In the inter-band type, two types of signal processing units are used to generate signals (for example, RFa and RFb) in each allocated frequency band (for example, a band of 2000 MHz and a band of 3500 MHz) for communication and output the generated signals. The output signals RFa and RFb are combined by a broadband signal combiner 31 and the combined signal is input to the device 1 under test through, for example, a coaxial cable.

The output signals RFa and RFb are radiated from antennas corresponding to each signal band to the device under test, depending on measurement methods.

Among the frequency bands using the TDD mode, a frequency band of 3500 MHz is separated from the frequency band using the FDD mode. Therefore, in order to correspond to both the TDD mode and the FDD mode, signal processing in at least a frequency band of 800 MHz, a frequency band of 1900 MHz, and a frequency band of 3500 MHz is needed. The test signal generation unit 29 and the RF signal conversion device 30 each need to have three or more signal processing systems in order to correspond to these three frequency bands. However, when the number of bands, which are combinations of the test standards and the inter-band type, is limited to two, two signal processing systems among three or more signal processing systems may be operated.

In this embodiment, the test signal is input to the device 1 under test (in this example, a base station) to test the device 1 under test. However, in the actual test, it is necessary to examine the response of the device 1 under test to the test signal and check the operation of the device 1 under test. As described above, in order to check the operation, for example, the following methods are used: a method using the error measurement function of the device 1 under test; a method of receiving radio waves transmitted from the device 1 under test and analyzing the received radio waves; and a method of analyzing the internal signals of the device 1 under test.

In the above-described embodiment, the system in which the baseband signal data generated by the test signal generation apparatus 20 is transmitted to the RF signal conversion device 30 has been described. However, the system may have any actual apparatus form or any method may be used to transmit the signal data.

That is, the functions of the test signal generation apparatus 20 and the functions of the RF signal conversion device 30 may be incorporated into one device, or the test signal generation apparatus 20 and the RF signal conversion device 30 may be separately configured. In addition, the following structures may be configured: a structure in which the baseband signal data generated by the test signal generation apparatus 20 is transmitted to the RF signal conversion device 30 through a communication interface; and a structure in which the baseband signal data generated by the test signal generation apparatus 20 is stored in various types of storage media (a hard disk, a non-volatile semiconductor memory, such as an SD memory card or a USB memory, and a disk, such as CD or DVD) and the RF signal conversion device 30 reads the signal data from the storage media and performs the quadrature modulation process and the frequency conversion process.

The display operation of each means of the test signal generation apparatus 20 for the display unit 21 or the designation operation of the operation unit 22 is not limited to the above-mentioned example, but the display operation and the designation operation may be performed in any form.

In the above-described embodiment, the device 1 under test is the base station corresponding to the LTE-Advanced system and the parameter file which is determined by the bandwidth and the test model that is defined in order to test the device 1 under test is selected and allocated to the designated CC. However, the device 1 under test according to the invention is not limited to the base station, but it may be a user equipment body corresponding to the LTE-Advanced system or an RF device used in a base station or a user equipment. In this case, the parameter file which is defined for the device under test may be stored and allocated to the designated CC.

DESCRIPTION OF REFERENCE NUMERALS AND SIGNS

1: device under test
20: test signal generation apparatus
21: display unit
22: operation unit
23: parameter setting unit
24: parameter file storage means
25: carrier arrangement designation means
26: parameter file designation means
27: parameter and frequency band allocation means
29: test signal generation unit
30: RF signal conversion device
31: signal combiner

What is claimed is:

1. A test signal generation apparatus based on an LTE-Advanced system comprising:
   a display unit;
   an operation unit;
   parameter file storage means for storing in advance test signal generating parameter files which can be allocated to a plurality of component carriers used to test an operation of a device under test, which is a base station or a user equipment corresponding to the LTE-Advanced system, or an RF device used in the base station or the user equipment;
   carrier arrangement designation means for displaying, on the display unit, a screen for selecting one of an intra-band type in which the plurality of component carriers are contiguously or non-contiguously arranged in one allocated frequency band for communication and an inter-band type in which the plurality of component carriers are divided and arranged in different allocated frequency bands for communication such that the operation unit is operated to designate one of the intra-band type and the inter-band type;
   parameter file designation means for displaying a screen for selecting the parameter files stored in the parameter file storage means on the display unit such that the operation unit is operated to designate any one of the parameter files;
   parameter and frequency band allocation means for displaying, on the display unit, a screen of a list of the plurality of component carriers and for designating at least one component carrier in the list and a screen for selecting the type of the allocated frequency band for communication in which the component carrier in the list is arranged, when the parameter file designation means designates the parameter file, such that the operation unit is operated to designate the component carrier to which the designated parameter file is allocated and the allocated frequency band for communication in which the component carrier is arranged; and
   a test signal generation unit that generates test signals for each component carrier in the designated allocated frequency band for communication on the basis of information designated by the carrier arrangement designation means and the parameter and frequency band allocation means.

2. The test signal generation apparatus based on an LTE-Advanced system according to claim 1,
   wherein the test signal generation unit includes plural types of signal processing units for generating signals such that signals used in different allocated frequency bands for communication are independently generated,
   when the intra-band type is designated, one type of signal processing unit gives a frequency offset to the signals, combines the signals, and outputs the combined signal, and
   when the inter-band type is designated, two types of signal processing units are used to generate baseband signals for each allocated frequency band for communication.

3. A test signal generation method based on an LTE-Advanced system comprising:
   a step of storing in advance test signal generating parameter files which can be allocated to a plurality of component carriers used to test an operation of a device under test, which is a base station or a user equipment corresponding to the LTE-Advanced system or an RF device used in the base station or the user equipment;

a step of displaying a screen for selecting, as the arrangement of the plurality of component carriers, one of an intra-band type in which the plurality of component carriers are contiguously or non-contiguously arranged in one allocated frequency band for communication and an inter-band type in which the plurality of component carriers are divided and arranged in different allocated frequency bands for communication such that one of the intra-band type and the inter-band type is designated;

a step of displaying a screen for selecting the test signal generating parameter files which can be allocated to the plurality of component carriers such that any one of the parameter files is designated;

a step of displaying a screen of a list of the plurality of component carriers and for designating at least one component carrier in the list and a screen for selecting the type of the allocated frequency band for communication in which the component carrier in the list is arranged such that the component carrier to which the designated parameter file is allocated and the allocated frequency band for communication in which the component carrier is arranged are designated; and a step of generating test signals for each component carrier in the designated allocated frequency band for communication on the basis of information about the type which is designated as the carrier arrangement, the parameter file allocated to the component carrier, and the allocated frequency band for communication in which the component carrier is arranged.

4. The test signal generation method based on an LTE-Advanced system according to claim 3, wherein the step of generating the test signals for each component carrier includes plural types of signal processing steps for generating signals such that signals used in different allocated frequency bands for communication are independently generated, when the intra-band type is designated, one type of signal processing step gives a frequency offset to the signals, combines the signals, and outputs the combined signal, and when the inter-band type is designated, two types of signal processing steps are used to generate baseband signals for each allocated frequency band for communication.

* * * * *